(12) United States Patent
Ariga

(10) Patent No.: US 6,721,014 B1
(45) Date of Patent: Apr. 13, 2004

(54) INTERNAL ARRANGEMENT AND BODY OF IMAGE SENSING APPARATUS

(75) Inventor: Kazuto Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/263,674

(22) Filed: Mar. 5, 1999

(30) Foreign Application Priority Data

Mar. 10, 1998 (JP) .......................................... 10-058113
Mar. 10, 1998 (JP) .......................................... 10-058114

(51) Int. Cl.[7] ............................................. H04N 5/225
(52) U.S. Cl. ........................ 348/374; 348/373; 348/376; 396/541
(58) Field of Search ............................... 348/374, 373, 348/376, 231.7; 396/541

(56) References Cited

U.S. PATENT DOCUMENTS

| | | | | |
|---|---|---|---|---|
| 4,456,931 A | * | 6/1984 | Toyoda et al. ............. | 386/118 |
| 4,712,898 A | * | 12/1987 | Haraguchi .................. | 396/539 |
| 4,887,161 A | * | 12/1989 | Watanabe et al. ......... | 348/231.7 |
| 5,187,655 A | * | 2/1993 | Post et al. .................... | 700/17 |
| 5,812,885 A | * | 9/1998 | Noguchi et al. .............. | 396/29 |
| 6,351,282 B1 | * | 2/2002 | DeLeeuw et al. ....... | 348/231.99 |
| 6,359,652 B1 | * | 3/2002 | Takada ........................ | 348/374 |
| 2003/0007080 A1 | * | 1/2003 | Taniguchi et al. ..... | 348/231.99 |

* cited by examiner

Primary Examiner—Andrew Christensen
Assistant Examiner—Dorothy Wu
(74) Attorney, Agent, or Firm—Morgan & Finnegan, LLP

(57) ABSTRACT

An image sensing apparatus has a photographic optical system, an image sensing device for converting an optical image formed by the photographic optical system into electric signals, a main board and an image sensing board for processing the electric signals from the image sensing device into image signals for displaying, transmitting to an external device, or recording on a detachable recording medium, and a power supply board for supplying electric power to the image sensing apparatus, where the photographic optical system is arranged between the main and image sensing boards and the power supply board.

13 Claims, 19 Drawing Sheets

INTERNAL ARRANGEMENT AND BODY OF IMAGE SENSING APPARATUS

BACKGROUND OF THE INVENTION

The present invention relates to an internal arrangement and body of an image sensing apparatus and, more particularly to, an arrangement of an image sensing unit, a signal processing unit, a monitor, a recording unit, and power supply unit of an image sensing apparatus, and a design of the body of the image sensing apparatus.

A conventional image sensing apparatus is described below with reference to FIGS. 18 to 20.

FIG. 18 is an external perspective view of a digital still camera as an example of a conventional image sensing apparatus. In FIG. 18, reference numeral 301 denotes a front cover, made of resin, having a rectangular hole 301a for a finder 305; 302, a back cover also made of resin; 303, a release button; 304, a stroboscope; 305, the finder; 306, an image sensing lens; 307, a monochromatic liquid crystal display (referred to as "LCD" hereinafter) for displaying information, such as the number of shots which can still be stored; and 308, a mode dial for changing modes of the camera, which is supported by an axis (not shown) so as to be rotatable about the axis in the directions shown by arrows P and Q. Further, reference numeral 309 denotes a pointer, printed on the back cover 302, to indicate which mode is selected by the mode dial 308.

FIG. 19 is a cross sectional view of the image sensing apparatus shown in FIG. 18 taken along a line A–A'. In FIG. 19, reference numeral 310 denotes an optical block configuring an image sensing system, including the image sensing lens 306 and a CCD (not shown); 311, a signal processing board; 312, a power supply board connected to the signal processing board 311 via a connector 313; 314, batteries as a power source, electrically connected to the power supply board 312; and 315, a battery area for the batteries 314.

FIG. 20 is a cross-sectional view of a tripod taphole and its vicinity of the camera, and reference numeral 316 denotes the tripod taphole integrally formed on the back cover 302.

In the digital still camera, as the conventional image sensing apparatus, shown in FIG. 18, the mode dial 308 is rotated in the direction of the arrow P, in this case, to set a mark 308a at the pointer 309. In turn, a CPU (not shown) of the camera makes the camera operable to sense an image, and image sensing conditions are displayed on the LCD 307. An operator checks an image through the finder 305, and if it is desired to capture the image, a release button 303 is pressed. The release button 303 has a two-step stroke configuration, and a first switch is turned on when the release button 303 is pressed halfway (half stroke), then preparation for an image sensing operation, such as photometry and a distance measuring operation, is performed. Further, a second switch is turned on when full stroke of the release button 303 is made, and the image sensing operation is executed. When an object to be sensed is dark, the stroboscope 304 automatically flashes. A sensed image is recorded in an internal memory (not shown).

For displaying the sensed image, the camera is first connected to a personal computer (PC) via a cable (not shown), and the mode dial 308 is rotated in the direction of the arrow Q to set a mark 308b at the pointer 309 to select a play mode. Thereafter, the operator can make a desired image displayed by operating the PC.

Next, an internal configuration of the conventional digital still camera is explained.

Referring to FIG. 20, the optical block 310 is installed in the camera, and connected to the signal processing board 311. The batteries 314 are set in the battery area 315, and electrically connected to the power supply board 312. The signal processing board 311 is supplied with electric power from the power supply board 312 via the connector 313.

The tripod taphole 316 is formed on the resin back cover 302. The front cover 301 and the back cover are joined together. The signal processing board 311 is not connected to the tripod taphole 316.

With the above configuration, the power supply board 312 which generally generates noise is connected to the signal processing board 311 via the connector 313, in addition, the distance between the power supply board 312 and the signal processing board 311 is short, therefore, noise is easily transferred to the signal processing board 311 and causes deterioration of an image.

Further, since the external body of the conventional camera is not grounded, and electrical circuits (boards) inside the camera are not properly grounded, the camera is easily affected by external noise and static electricity.

Further, the pointer 309 for the mode dial 308 is printed on the back cover 302, which is a part of the external body, thus a printing mechanism for printing the pointer at a precise position as well as printing of the pointer on the back cover 302 itself cost considerably, which causes an increase in manufacturing cost of the back cover 302.

Further, it is necessary to provide means, on a member for guiding the mode dial 308, for matching positions between the mode dial 308 and the back cover 302, thus, the shape of the member becomes complicated.

SUMMARY OF THE INVENTION

The present invention has been made in consideration of the above situation, and has as its first object of the present invention to provide a camera which is not easily affected by noise from a power supply circuit and capable of keeping an image quality high.

Further, it is a second object of the present invention to provide a small camera of good portability which is not easily affected by noise.

Furthermore, it is a third object of the present invention to provide a camera which is not easily affected by external noise and static electricity.

Further, it is a fourth object of the present invention to realize a pointer which can be easily recognized by the user at low cost. According to the present invention, the foregoing first and second object is attained by providing an image sensing apparatus having: a photographic optical system; an image sensing device for converting an optical image formed by said photographic optical system into electric signals; a signal processing unit for processing the electric signals from the image sensing device into image signals for displaying, transmitting to an external device or recording on a detachable recording medium; and a power supply unit for supplying electric power to the image sensing apparatus, wherein said photographic optical system is arranged between the signal processing unit and the power supply unit.

Preferably, the image sensing apparatus further comprises a frame whose cross-section has a C-letter shape, wherein the signal processing unit and the power supply unit are fixed to respective arms of the C-letter shape of the frame.

Further, according to the present invention, the foregoing third object is attained by providing the image sensing apparatus, further comprising: an accessory fixing part made of conductive material; a front cover made of conductive material; and a back cover made of conductive material, wherein the front cover, the back cover, and the frame are grounded via the accessory fixing part.

Further, according to the present invention, the foregoing fourth object is attained by providing an electric device comprising an internal structure having a protuberance which functions as a pointer, wherein the protuberance is used for positioning between a cover and the internal structure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described below in detail in accordance with the accompanying drawings.

First Embodiment

[Configuration]

Figure 1:
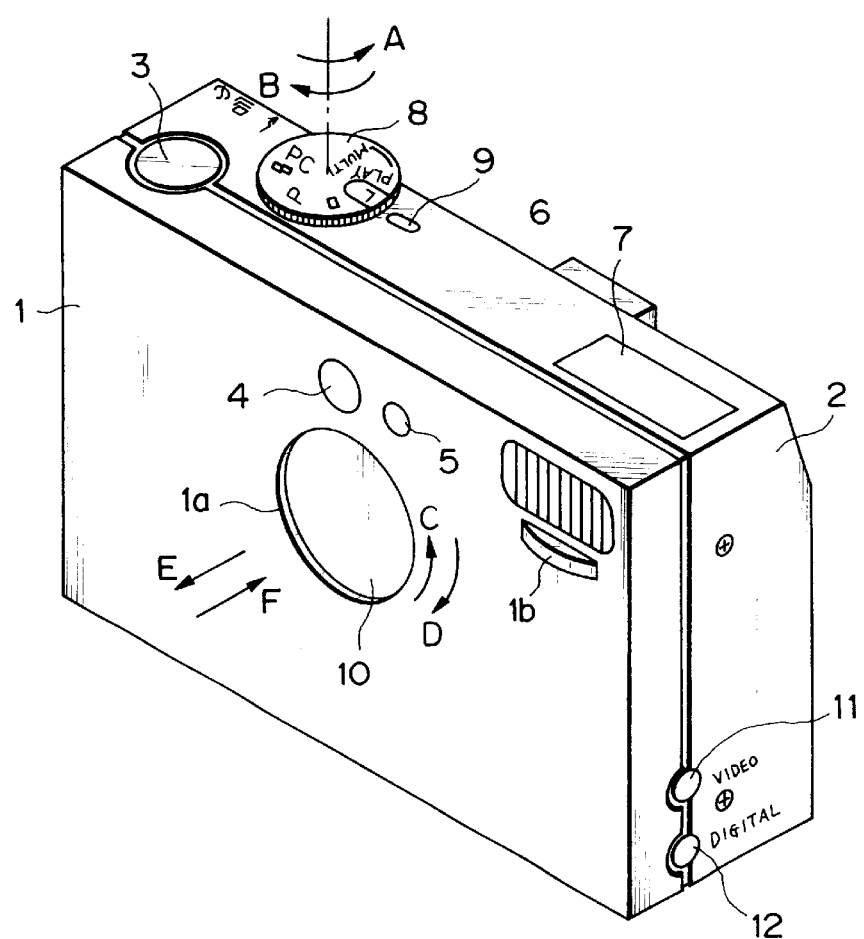
FIG. 1 is a perspective view showing an external configuration of the front of a digital still camera according to a first embodiment of the present invention.

FIG. 1 shows an external view of the front of a digital still camera according to the first embodiment of the present invention. In FIG. 1, reference numeral 1 denotes a front cover, made of metal, having a hole 1a for a lens barrel 14 (FIG. 2) and a protuberance 1b for preventing a stroboscope 6 from being covered by, e.g., covered by a finger while sensing an image; 2, a back cover also made of metal; 3, a release button; 4, a finder window; 5, a supplementary light used when measuring a distance to a dark object in an automatic focusing operation; 6, the stroboscope having a light for easing a pink-eye effect; 7, a monochromatic liquid crystal display (referred to as "B/W LCD" hereinafter) for displaying information, such as the number of shots which can still be stored; and 8, a mode dial for changing modes of the camera, which is supported by an axis (not shown) so as to be rotatable about the axis in the directions shown by arrows A and B.

Further, reference numeral 9 denotes a pointer for notifying a user of which mode is selected by the mode dial 8; 10, a barrier for protecting a lens 13 (FIG. 2); 11, a video jack for connecting the camera to an external monitor, such as a television monitor, via a cable in order to display a sensed image or images on the monitor; and 12, a jack for connecting the camera to a personal computer (PC) via a cable in order to transmit a sensed image or images to the PC.

Figure 2:
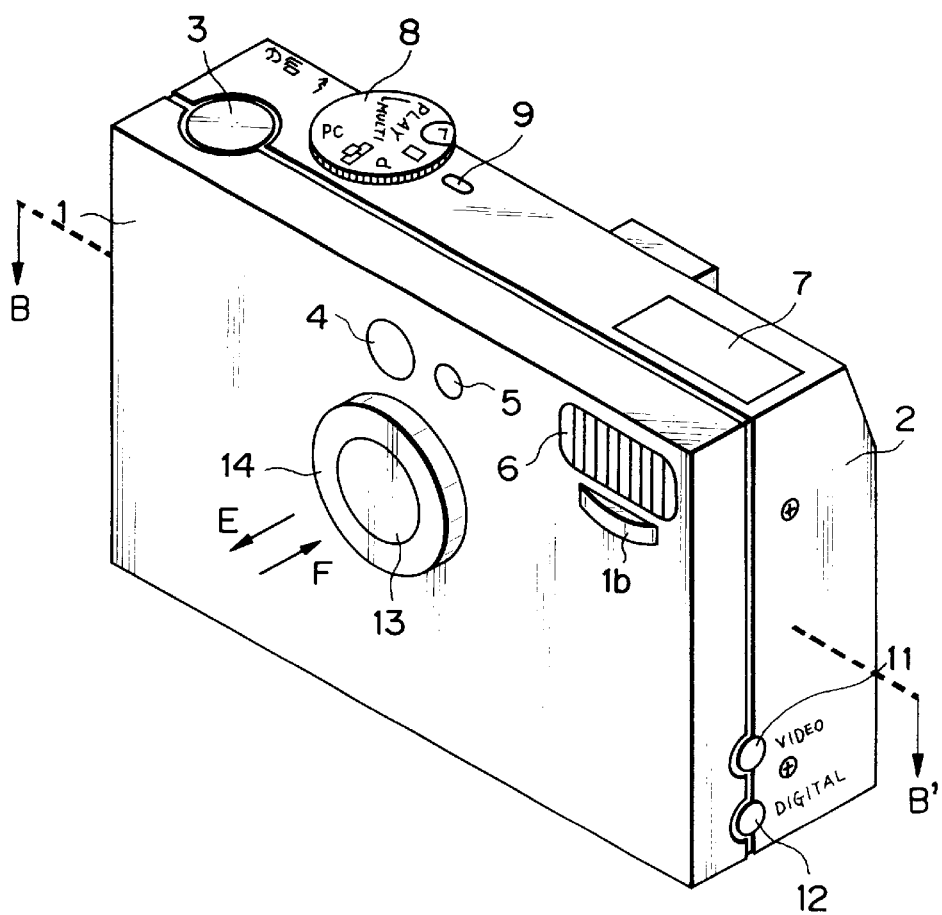
FIG. 2 is a perspective view showing an external configuration of the front of the digital still camera shown in FIG. 1 when the camera is ready for image sensing operation.

FIG. 2 is a perspective view of the front of the camera shown in FIG. 1 when the camera is ready for sensing an image. In FIG. 2, reference numeral 13 denotes the lens; and 14, the lens barrel, for supporting the lens 13, movable in the direction of arrows E and F for focusing on an object.

Figure 3:
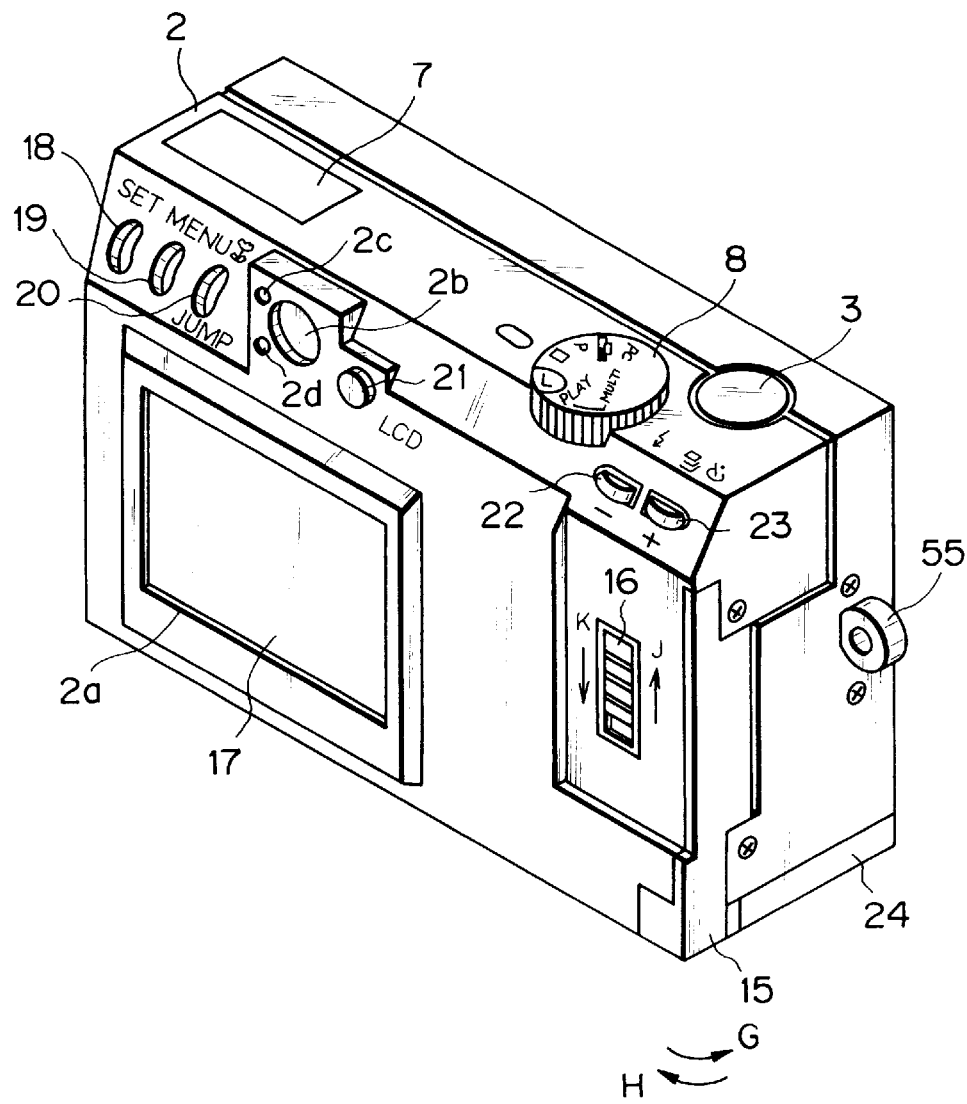
FIG. 3 is a perspective view showing an external configuration of the back of the digital still camera shown in FIG. 2.

FIG. 3 is a perspective view showing the back of the camera, shown in FIG. 2, when the camera is ready for sensing an image. Referring to FIG. 3, a rectangular opening 2a for a color liquid crystal display (color LCD) 17, a hole 2b for the finder, a hole 2c for an LED 127 (will be described later with reference to FIG. 5), and a hole 2d for an LED 128 (will be also described later with reference to FIG. 5) are formed on the back cover 2. Reference numeral 15 denotes a cover (CF cover) for protecting a compact flash card (referred to as "CF card" hereinafter), which is supported so as to be rotatable in the direction of arrows G and H and fastened to the camera as a claw (not shown) of the CF cover 15 engages with a member of the camera for holding the claw. Further, when the CF cover 15 is properly closed, a protuberance (not shown) of the CF cover 15 is pressed against a CF detection switch (not shown) for determining whether or not the CF cover 15 is closed.

Reference 16 denotes a CF lock, which is pushed upward in the direction of an arrow J, and engages with the claw (not shown) of the CF cover 15 to hold the CF cover 15 closed; 17, the color LCD which functions as an electronic view finder (EVF) for displaying an image to be sensed as well as functions as a monitor for displaying a sensed image or images; 18, a set button which functions as an enter key when changing settings of the camera; 19, a menu button for calling guide images for various settings of the camera; and 20, a macro button for performing close-up image sensing when the camera is in an image sensing mode, and for changing displayed images when the camera is in a play mode.

Reference numeral 21 denotes an LCD button for turning on/off the color LCD 17; 22, a minus button used for switching between an enforced operation of the stroboscope, enforced forbidden of the stroboscope, and a pink-eye easing operation when the camera is set to a program mode and a switch mode, and for instructing to display a previous image when the camera is in the play mode; 23, a plus button which is used for initiating a sequential image sensing operation and setting a self timer when the camera is in the image sensing mode, and for instructing to display a next image when the camera is in the play mode; 24, a battery cover for holding battery or batteries (not shown); and 55, a metal strap ring.

Figure 4:
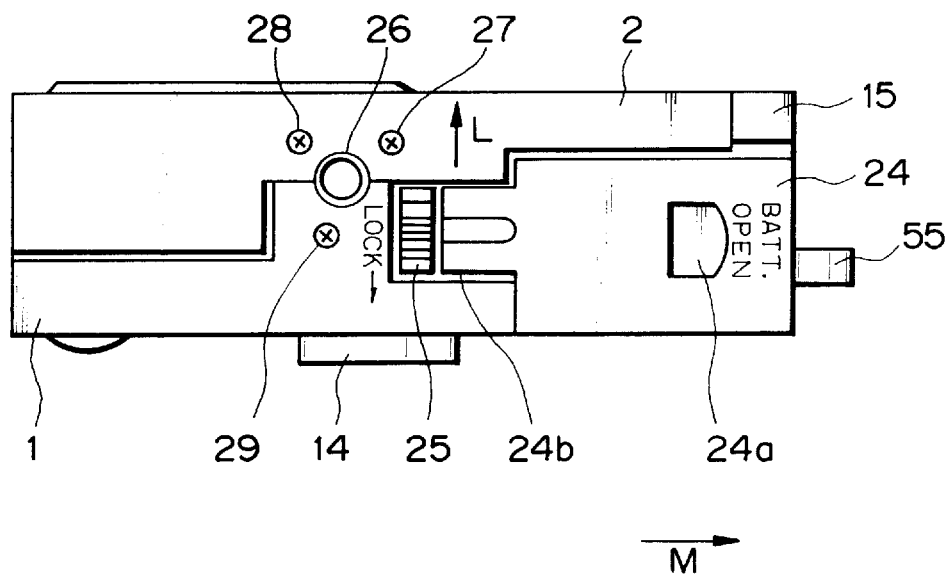
FIG. 4 is a bottom view of the digital still camera according to the first embodiment.

FIG. 4 shows the back of the camera which is ready for sensing an image. In FIG. 4, reference numeral 25 denotes a lock member so that the battery cover 24 does not open unexpectedly; and 26, a tripod taphole, as a member for mounting an accessory, and which has screw threads for screws 27, 28 and 29 so that the tripod taphole 26 is fixed to the front and back covers 1 and 2 of the camera with the screws 27, 28 and 29.

Figure 5:
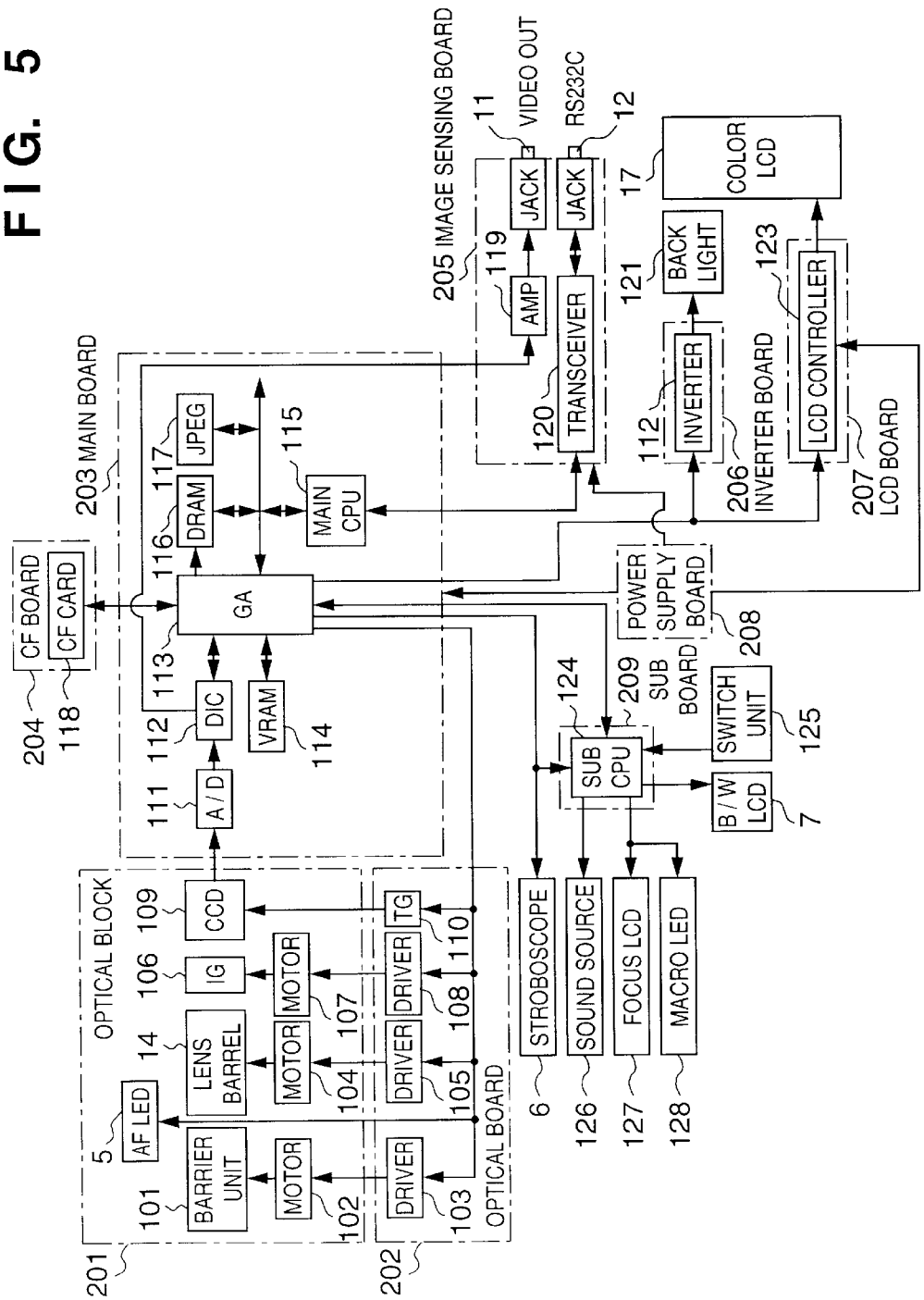
FIG. 5 is a block diagram illustrating a configuration of the digital still camera according to the first embodiment.

FIG. 5 is a block diagram illustrating a configuration of the digital still camera according to the first embodiment. In FIG. 5, reference numeral 201 denotes an optical block, and reference numeral 202 denotes an optical board. In the optical block 201 and the optical board 202, reference numeral 101 denotes a barrier unit having the barrier 10 for protecting the lens 13; 102, a motor as a driver of the barrier unit 101; 103, a driver for controlling the motor 102; 104, a motor as a driver for moving the lens barrel 14; 105, a driver for controlling the motor 104; 106, an IG as a diaphragm; 107, a motor for driving the IG 106; 108, a driver for controlling the motor 107; 109, a solid-state image sensing device (referred to as "CCD" hereinafter) for converting an optical image into electrical signals; and 110, a timing signal generator (TG) for operating the CCD 109.

Reference numeral 203 denotes a main board, and reference numeral 111 denotes an analog-digital (A/D) converter for converting analog signals to digital signals; 112, a digital integrated circuit (DIC) for processing digital signals; 113, a gate array (GA); 114, video RAM (VRAM) for storing image data to be displayed on the color LCD 17 (FIG. 3); 115, a main CPU; 116, DRAM; and 117, a JPEG integrated circuit. Further, reference numeral 118 denotes a CF card as a storage medium of the image data on a CF board 204.

Reference numeral 205 denotes an image sensing board, and reference numeral 119 denotes an amplifier for video output; and 120, a transceiver for communicating with a PC. Further, reference numeral 121 denotes a backlight as a light source of the color LCD 17; 122, an inverter for driving the backlight 121; and 123, a LCD controller for the color LCD 17.

Further, reference numeral 124 denotes a sub CPU for controlling an operation system of the camera; 125, a switch unit including various switches of the operation system; 126, a sound source for make a sound when focusing on an object is completed and a shutter of the camera is released, for instance; 206, an inverter board including the inverter 122; 207, an LCD board including the LCD controller 123; 208, a power supply board for providing electric power to each circuit; and 209, a sub board including the sub CPU 124.

Figure 6:
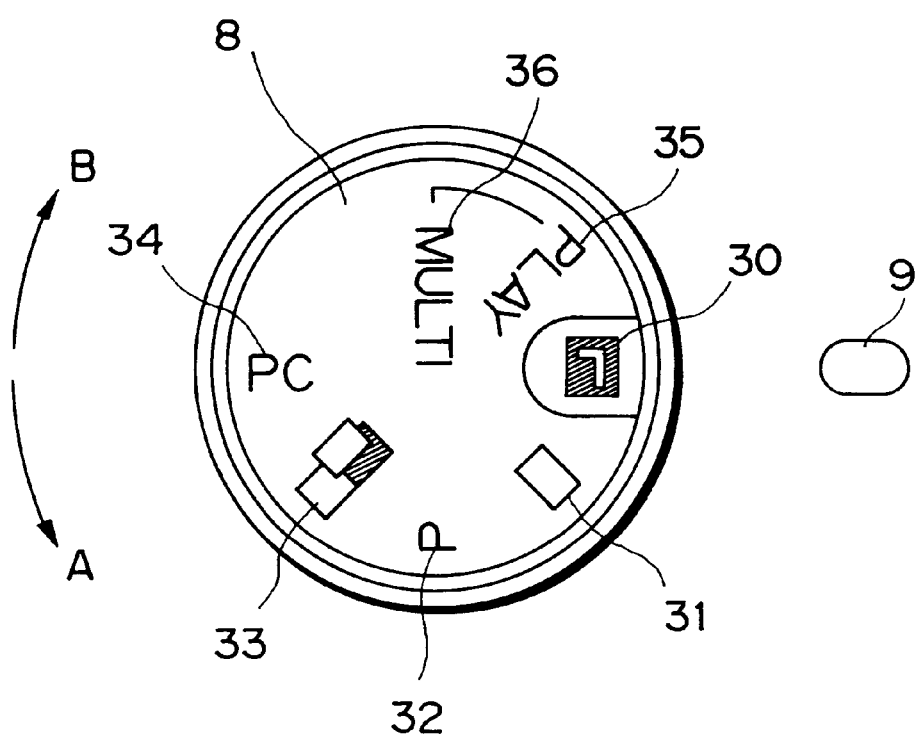
FIG. 6 is an explanatory view of a mode dial on the digital still camera according to the first embodiment.

FIG. 6 is an explanatory view of marks for selecting an operation mode on the mode dial 8 (FIG. 2). In FIG. 6, a mark 30 indicates a lock for inhibiting operation of the camera; 31, a green mode for sensing an image in a predetermined quality which the operator is prohibited from changing; 32, a program mode in which the operator is allowed to change image sensing conditions to sense an image; 33, a switch mode for sensing a plurality of images so that the sensed images are synthesized into an image of wide width, long height, or 2×2 images (two images both in the horizontal and vertical directions; namely, four images are synthesized) using software; 34, a PC communication mode for connecting with a PC and transmitting images; 35, the play mode for displaying images recorded on the CF card 118; and 36, a multi mode for collectively displaying recorded images, up to nine images.

Figure 7:
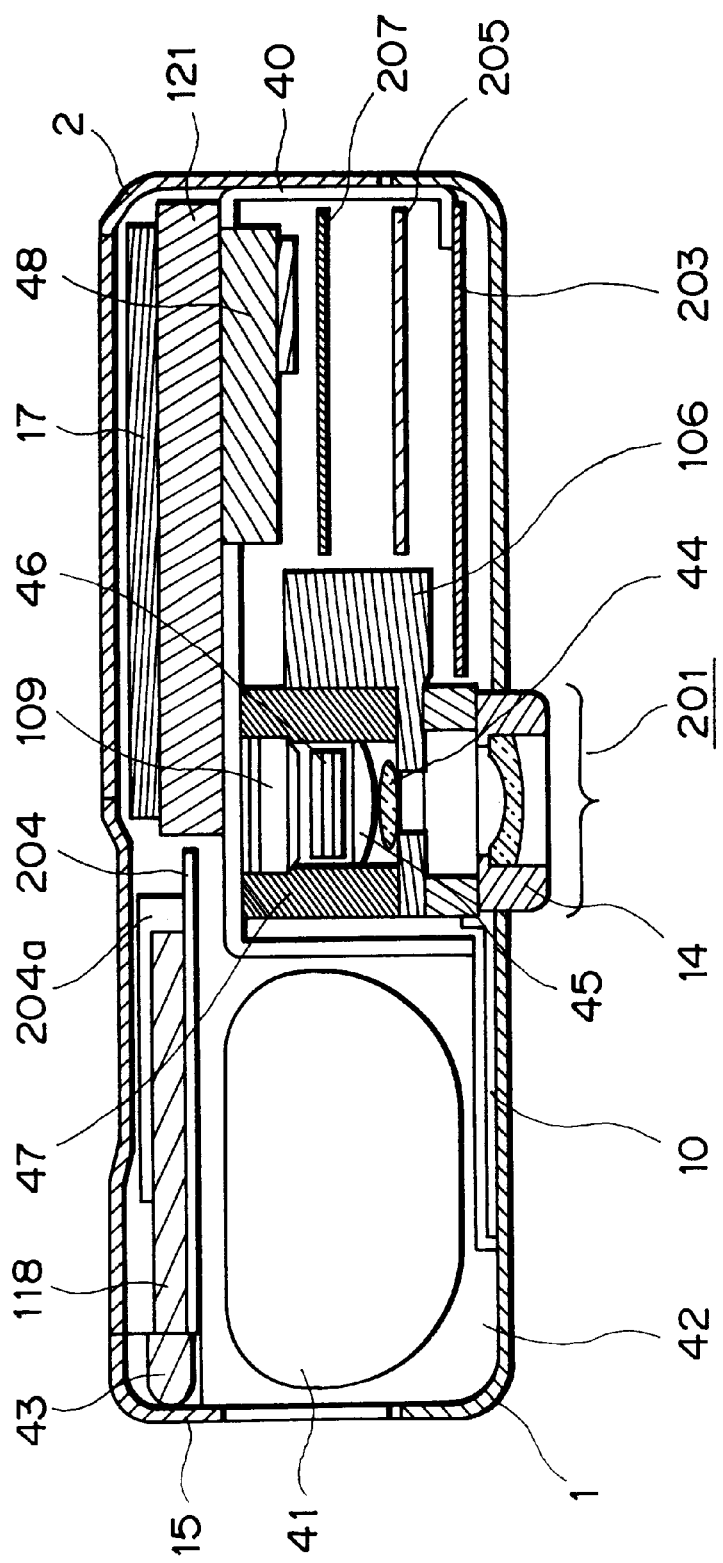
FIG. 7 is a cross-sectional view of the digital still camera shown in FIG. 2 taken along a line B–B'.

FIG. 7 is a cross-sectional view of the digital still camera shown in FIG. 2 taken along a line B–B'. In FIG. 7, reference numeral 40 denotes a frame having a C-letter shape whose opening is in the front of the camera; 41, a battery, as a power source, which electrically connects to the power supply board 208 (FIG. 5); 42, a battery area for storing the battery 41; 43, an ejector for ejecting the CF card 118 from the camera; 44 and 45, lenses; 46, a low-pass filter; 47, a CCD block including the lenses 44 and 45, low pass filter 46, and the CCD 109; and 48, a shield case for holding the inverter board 206 inside.

Figure 8:
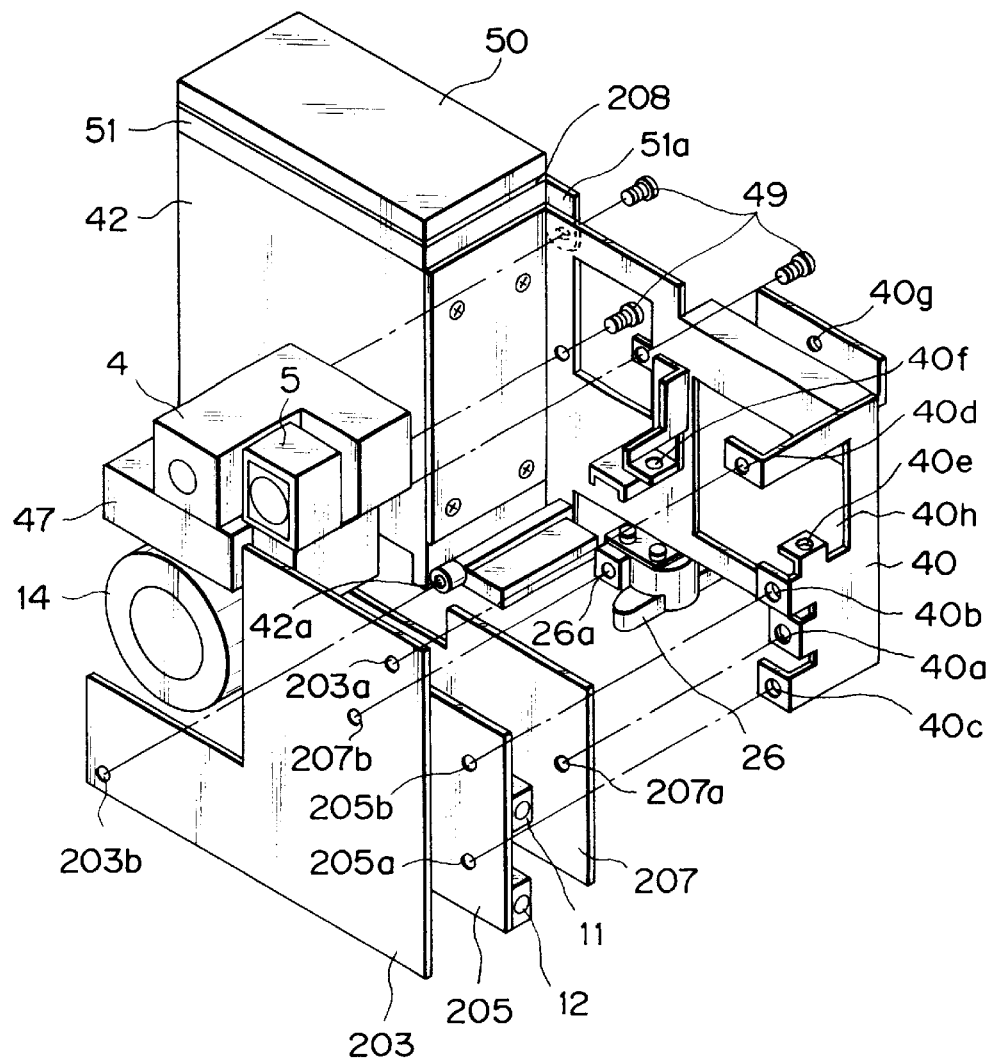
FIG. 8 is an exploded view of an internal configuration of the digital still camera shown in FIG. 2.

FIG. 8 is an exploded view for explaining an internal configuration of the camera. In FIG. 8, reference numeral 49 denotes screws for fixing the optical block 201 to the frame 40; 50, a shield case U electrically connected to the power supply board 208; 51, a shield case D, having a lug 51a for mechanically and electrically connecting to the frame 40, which is electrically connected to the power supply board 208; and 52, screws for fixing the tripod taphole 26 to the frame 40.

Figure 9:
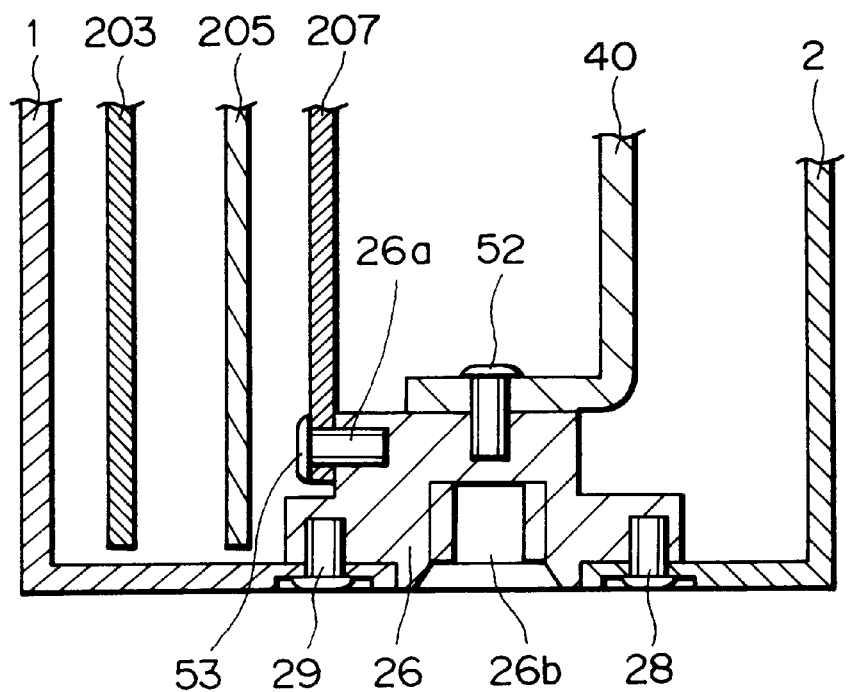
FIG. 9 is a vertical cross-sectional view of a tripod taphole and its vicinity.

FIG. 9 is a vertical cross-sectional view of the tripod taphole 26 and its vicinity, and reference numeral 53 denotes a screw for fixing the LCD board 207 to the tripod taphole 26.

Figure 10:
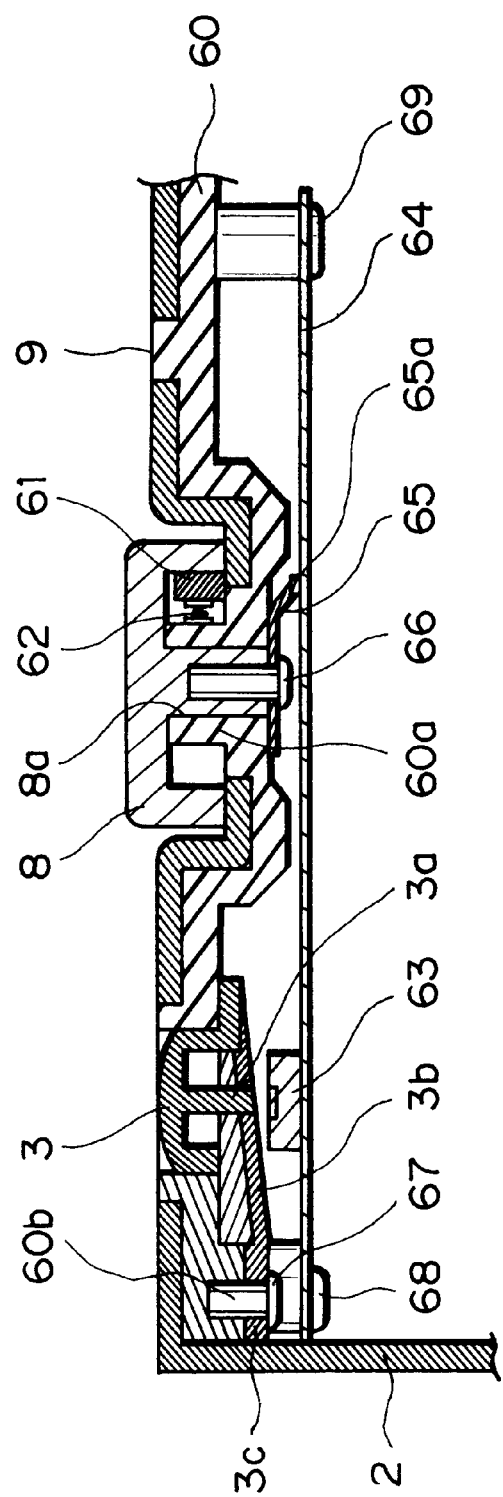
FIG. 10 is a vertical cross-sectional view of the mode dial and its vicinity.

FIG. 10 is a vertical cross-sectional view of the mode dial 8 and its vicinity stretching to the release button 3. In FIG. 10, reference numeral 60 denotes an internal configuration member, (referred to as "release base" hereinafter) having an protuberance, i.e., the pointer 9, a cylinder portion 60a for supporting a boss 8a of the mode dial 8 so as to be rotatable, and a hole 60b for a screw 67 to fix the release button 3 onto the release base; 61, a member for producing clicking texture as the mode dial 8 is rotated; 62, a spring for pushing the member 61 against the mode dial 8; and 63, a release switch having a two-step stroke configuration, and the first switch is turned on in response to the half stroke of the release button 3, in turn, preparation for an image sensing operation, such as photometry and a distance measuring operation, is performed, and the second switch is turned on in response to the full stroke, in turn, the image sensing operation is executed.

Further, reference numeral 64 denotes an operation board, having the release switch 63, on which dial code patterns are formed; 65, a brush which touches one of the dial cord patterns of the operation board 64 at a hook 65a; 66, a screw for fixing the blush 65 to the mode dial 8; 67, a screw for fixing the release button 3 to the release base 60; and 68 and 69, screws for fixing the operation board 64 to the release base 60.

Figure 11:
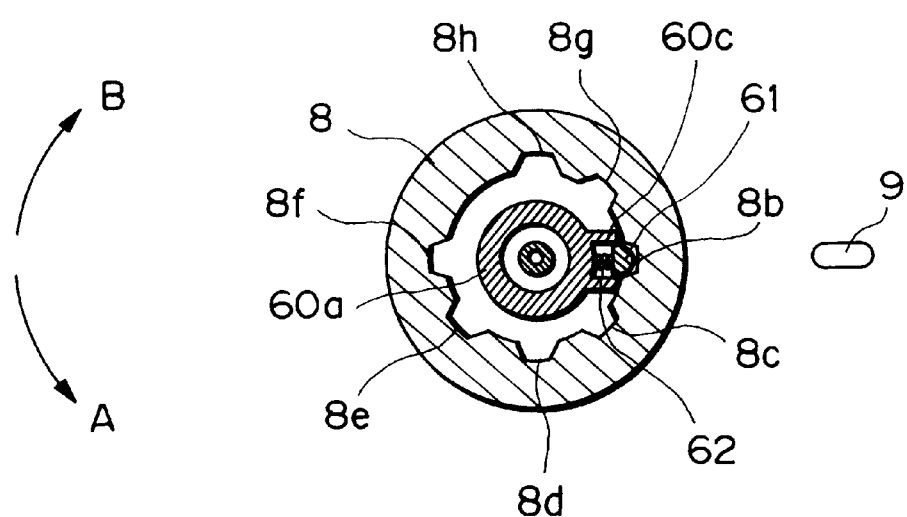
FIG. 11 is a horizontal cross-sectional view of the mode dial.

FIG. 11 is a horizontal cross-sectional view of the mode dial 8 and its vicinity including the pointer 9. Referring to FIG. 11, a rib 61c of the release base 60 guides the member 61 and the spring 62, and the member 61 engages with respective grooves 8b to 8h formed on the mode dial 8, thereby giving clicking texture when the mode dial 8 is rotated.

Figure 12:
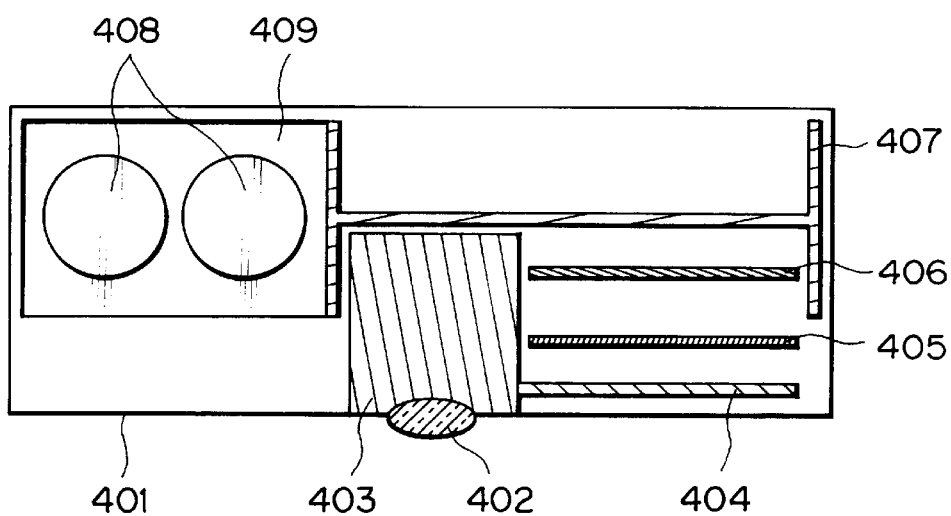
FIG. 12 is a horizontal cross-sectional view of a camera having a frame of another shape.

FIG. 12 is a horizontal cross-sectional view of a frame having another shape. In FIG. 12, reference numeral 401 denotes a cover; 402, an image sensing lens; 403, an optical block including a CCD (not shown) and configuring an image sensing system; 404, a first circuit board; 405, a second circuit board; 406, a power supply board; 407, a frame having an H-letter shape; 408, batteries as a power source, which is electrically connected to the power supply board 406; and 409, a battery area for storing the battery 408.

[Operation]

Next, an image sensing operation of the camera shaving the aforesaid configuration is explained.

The camera shown in FIG. 1 is in a sleep state. When the operator rotates the mode dial 8 in the direction of the arrow A, and sets, e.g., the mark 31 indicative of the green mode (FIG. 6) at the pointer 9, the hook 65a of the brush 65, shown in FIG. 10, connects one of the dial code patterns corresponding to the green mode out of the dial cord patterns (not shown) on the operation board 64.

In turn, a signal is inputted from the switch unit 125 to the sub CPU 124, and the sub CPU 124 notifies the main CPU 115 of the operator having selected the green mode via the gate array 113. The main CPU 115 outputs a signal to instruct the barrier unit 101 to open the barrier 10, then outputs a signal for extending the lens barrel 14. Simultaneously, the main CPU 115 accesses the CF card 118 and checks an available capacity of the CF card 118, then displays image sensing conditions, such as the number of shots which can be stored in the available storage area, a predetermined image quality, and size of an image.

In the camera as shown in FIG. 1, the barrier 10 opens as it moves in the direction of an arrow C, and the lens barrel 14, shown in FIG. 2, extends in the direction of an arrow E.

FIG. 2 shows the foregoing state of the camera. Then, the operator views an object through the finder window 4, and presses the release button 3 when the operator wants to capture an image. As shown in FIG. 10, the release button 3 is set in the release base 60 by the screw 67 at a base unit 3c, and pushed upward by an arm 3b, having a e-letter shape. Thus, when the release button 3 is pressed against the arm 3b, a protuberance 3a pushes down the release switch 63. The release switch 63 has a two-step stroke configuration, as described above, and a half-stroke turns on the first switch.

Then, a signal enters the sub CPU 124 (FIG. 5) from the switch unit 125, and the sub CPU 124 notifies the main CPU 115 that the first switch is pressed via the gate array 113. The main CPU 115 starts preparing for an image sensing operation by performing, e.g., photometry and a distance measuring operation. If an object is dark, then the distance to the object is measured by turning on the supplementary light 5 (FIG. 2). After the preparation for an image sensing operation is completed, the main CPU 115 notifies the operator that the camera is ready for performing an image sensing operation by making the sound source 126 generate a sound as well as turning on a green LED out of the two LEDs 2c (FIG. 3), if a normal image sensing operation is to be performed, or turning on a red LED if an image sensing operation needs the support of the stroboscope.

Thereafter, the operator presses the release button 3 deeper (full stroke) to turns on the second switch, thereby the image sensing operation is performed. After the image sensing operation is completed, the sound source 126 makes a sound to notify the operator of completion of the image sensing operation, as well as the sensed image is recorded on the CF card 118.

Further, when the LCD button 21 shown in FIG. 3 is pressed under the green mode, the main CPU 115 displays a live image on the color LCD 17, in which case, the color LCD 17 is used as an eye view finder.

For taking a close-up image, the macro button 20 is pressed. In turn, a signal enters the sub CPU 124 from the switch unit 125 (FIG. 5), then the sub CPU 124 informs the main CPU 115 that the macro button 20 is pressed via the gate array 113. The main CPU 115 displays a macro mark on the B/W LCD 7 as well as an algorithm for moving the lens barrel 14 is changed to correspond to a close-up image sensing operation.

After the operator presses the release button halfway and the camera is focused, then the main CPU 115 makes the sound source 126 generate a sound as well as turns on an orange light of a macro LED 2d to notify the operator that the camera is focused. Then, the operator fully presses the release button 3 to turn on the second switch to execute an image sensing operation. After the image sensing operation is completed, then the sound source 126 generates a sound notifying of the completion of the image sensing operation, as well as the sensed image is recorded on the CF card 118.

Various settings, such as image quality, size, date, brightness of the color LCD, on/off of a power saving mode, resetting of the file numbers, deletion of an image, and formatting of a CF card, are instructed using the menu button 19 shown in FIG. 3. When the menu button 19 is pressed, the main CPU 115 displays a menu (not shown) on the color LCD 17. Thus, the operator selects an item by operating the plus button 23 or the minus button 22, and presses the set button to settle on the selection. The menu button 19 is to be pressed again to exit from the menu.

Figure 19:
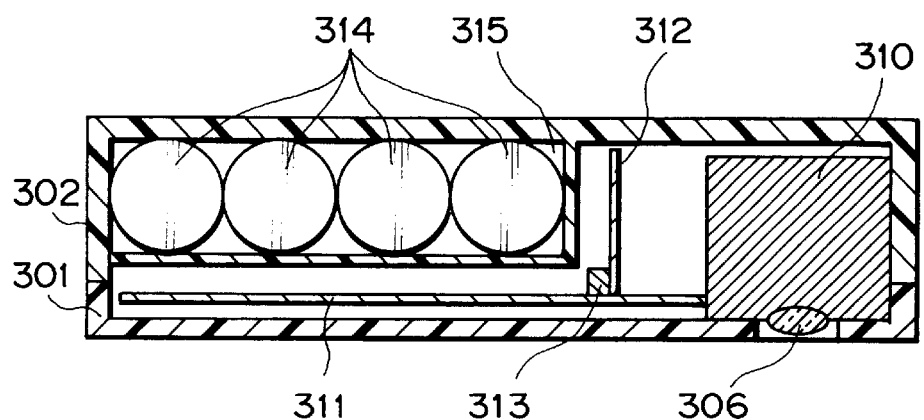
FIG. 19 is a cross-sectional view of the digital still camera shown in FIG. 18 taken along a line A–A'.
Figure 20:
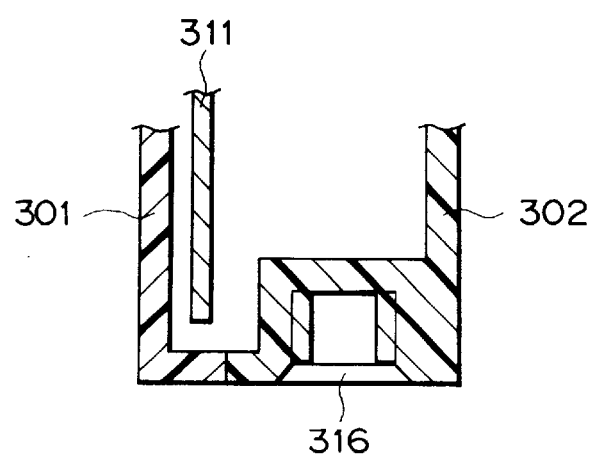
FIG. 20 is a vertical cross-sectional view of a conventional tripod taphole and its vicinity.

In order to end the operation of the camera, the mode dial 8 is rotated to set the lock 30 at the pointer 9 (FIG. 6), thereby the hook 65a of the brush 65 shown in FIG. 19 connects one of the dial cord patterns for locking the camera out of the dial cord patterns (not shown) on the operation board 64.

Accordingly, a signal enters the sub CPU 124 from the switch unit 125 shown in FIG. 5, and the sub CPU 124 informs the main CPU 115 that the operator selected the lock via the gate array 113. In turn, the main CPU 115 issues a signal to withdraw the lens barrel 14, then a signal to close the barrier 10 (FIG. 1) of the barrier unit 101. At the same time, communication with the CF card 118 is terminated, and the B/W LCD 7 is turned off.

More specifically, referring to FIG. 1, the lens barrel 14 (not shown) is moved in the direction of an arrow F, then the barrier 10 moves to close in the direction of an arrow D about an axis (not shown).

To exchange the CF card 118 (FIG. 5), the CF lock 16 shown in FIG. 3 is slides in the direction of an arrow K to release an engagement with a craw (not shown) of the CF cover 15. Since the CF cover 15 is pushed in the direction of an arrow G by the CF detection switch (not shown), when the engagement is released, the CF cover 15 rotates automatically in the direction of an arrow G and the CF card 118 reveals. In this state, the operator pushes the ejector 43 (FIG. 7) into the camera, and the CF card 118 can be taken out.

For exchanging the battery 41, referring to FIG. 4, the lock member 25 is slide in the direction of an arrow L, thereby releasing the engagement (not shown) with the battery cover 24. Next, the operator slides the battery cover 24 in the direction of an arrow M with a finger on a concave portion 24a of the battery cover 24, then picks the battery cover 24 and rotates it about a fulcrum 24b (in the outgoing direction of the drawing). In this stage, the battery 41 is exposed, thus the operator can exchange batteries.

Note, when the lock member 25 slides in the direction of the arrow L, engagement between the lock member 25 and the battery cover detection switch (not shown) provided on the main board 203 (FIGS. 5 and 7) is released, too. Thus, the main CPU 115 forces a system of the camera to shut down if the system is operating. This is because when the battery is unexpectedly taken out while operating the system, there is a possibility that the CF card 118 is damaged.

[Internal Configuration]

Next, the internal configuration of the camera is explained with reference to FIG. 7.

Referring to FIG. 7, the frame 40 has a C-letter shape, and its opening is in the front side of the camera. Accordingly, the optical block 201 as an image sensing system, the main board 203 as a signal processing board, the image sensing board 205, and the LCD board 207 for controlling the color LCD 17 are mounted within the frame 40 in such a manner as described later. Further, the shield case 48 covering the inverter board 206 may also be formed within the frame 40, thereby making the camera compact by making the best use of the space.

Below, reasons that the frame 40 has the C-letter shape and its opening is in the front side of the camera are explained.

(1) When the opening of the C-letter shaped frame 40 is in the back of the camera, since the image sensing lens has to be set toward the front of the camera, it is necessary to make a large hole for the lens barrel 14, having the image sensing lens in it, so as to extend from the camera, which weakens the strength of the frame as well as requires a brim for fixing the optical block 201 to the frame. In addition, the lens barrel 14 needs to avoid the brim, thus, the size of the camera increases.

(2) The reason of the frame 40 having the C-letter shape is that, if a folded portion is made in this side of the drawing, the finder 4 can not be formed, and if a folded portion is made in the other side of the drawing, it is necessary to reduce the sizes of the respective boards or to increase the size of the camera. In other words, it is not possible to make a folded portion as to form eaves of the frame 40, further, the folded portion in the bottom causes an increase in the size of the camera. Accordingly, the C-letter shape is an optimal shape for reducing the size of the camera.

Further, if the frame has an H-letter shape as the frame 407 shown in FIG. 12, since the optical block 403 has to be arranged at an extended position of the camera, even if the CF card 118 (FIG. 5) and the color LCD 17 (FIG. 3) are removed from the camera, the camera remains thick.

For the foregoing reasons, the frame 40 is designed to have a C-letter shape, and its opening is designed to be to the front side of the camera.

Further, referring to FIG. 7, the frame 40 is fixed to the battery area 42, which stores the battery 41, with a screw (not shown) at the short side of the frame 40, thereby forming a basic structure of the camera. Behind the frame 40, the color LCD 17, the backlight 121, and the CF board 204 are arranged on substantially the same plane. Further, a CF slot 204a for mechanically and electrically connecting with the CF card 118 is provided on the CF board 204.

By arranging the color LCD 17, the backlight 121, and the CF board 204 on substantially the same plane, the thickness of the camera is reduced. In contrast, if the CF board 204 is arranged over the battery area 42 and if the color LCD 17 and the backlight 121 are arranged over the CF board 204, for instance, the camera would have considerable thickness, although it is possible to provide enough space for the other boards.

When the portability of the camera is considered, a thick camera may not fit, e.g., a breast pocket, and its commercial value is low. Accordingly, it is urged to design a thin camera.

Next, an arrangement of the respective boards in the camera is explained with reference to FIG. 8.

The power supply board 208 for providing electric power to each board is electrically connected to the battery 41 (FIG. 7) and arranged in the battery area 42. The power supply board 208 is covered by the shield case U 50 and the shield case D 51 for shielding from noise.

The shield case U 50 and the shield case D 51 are both electrically connected to ground of the power supply board 208. The lug 51a of the shield case D 51 is fixed and mechanically and electrically connected to the frame 40 with screws 49 together with the optical block 201.

The optical block 201 is fixed to the frame 40 via the screws 49 next to the battery area 42. The LCD board 207 is fixed to a screw thread 40a of the frame 40 and a screw thread 26a of the tripod taphole 26 through holes 207a and 207b with screws.

The image sensing board 205 is fixed to screw threads 40b and 40c of the frame 40 through holes 205a and 205b with screws.

The main board 203 is fixed to a screw thread 40d of the frame 40 and a screw thread 42a of the battery area 42 through holes 203a and 203b with screws.

The optical board 202 (not shown) is fixed to screw threads 40e and 40f of the frame 40. Further, the stroboscope 6 (not shown) is fixed to a screw thread 40g of the frame 40 with a screw.

The shield case 48 (not shown) covering the inverter board 206 is arranged within the camera through a rectangular hole 40h of the frame 40 (see FIG. 7).

The tripod taphole 26 is mechanically and electrically connected to the frame 40 with screws 49.

The reasons for arranging each configuration element as described above are described below.

(1) The battery and the power supply circuit, as a power source, are preferably physically arranged near each other so as to minimize loss of the energy while transmitting the electric power. Accordingly, the power supply board 208 is arranged over the battery area 42.

(2) The power supply board 208 may generate noise while operating. If noise enters units for processing signals, such as the main board 203 and the image sensing board 205, noise may affect the image, which causes deterioration of the image. Further, noise may cause miss-operation, such as hang-up, in the other board. Accordingly, the shield case U 50 and the shield case D 51 cover the power supply board 208 to shield noise. Further, it is also effective to arrange units for signal processing and/or other processing at physically separated positions from the power supply board 208.

However, by physically separating the respective boards unconditionally, it is not possible to make a small portable camera. Thus, the optical block 201 is arranged next to the battery area 42 connected to the power supply board 208, and circuits for signal processing and other purposes are arranged on the other side of the optical block 201. Accordingly, the power supply board 208 and the other circuits are separated by the optical block 201; thereby a camera which is not easily affected by noises as well as whose size is minimized is realized by arranging the optical block 201 next to the battery area 42 so as not to waste room in the camera.

(3) Another reason of arranging the optical block 201 next to the battery area 42 is to make the camera have a familiar appearance of a conventional camera. More specifically, in most of cameras which use 35mm films, an image sensing lens is arranged at about the center of the camera, and this arrangement has not been changed for about 100 years since such a camera was invented; therefore, this design of the camera is familiar to people in the world.

Figure 18:
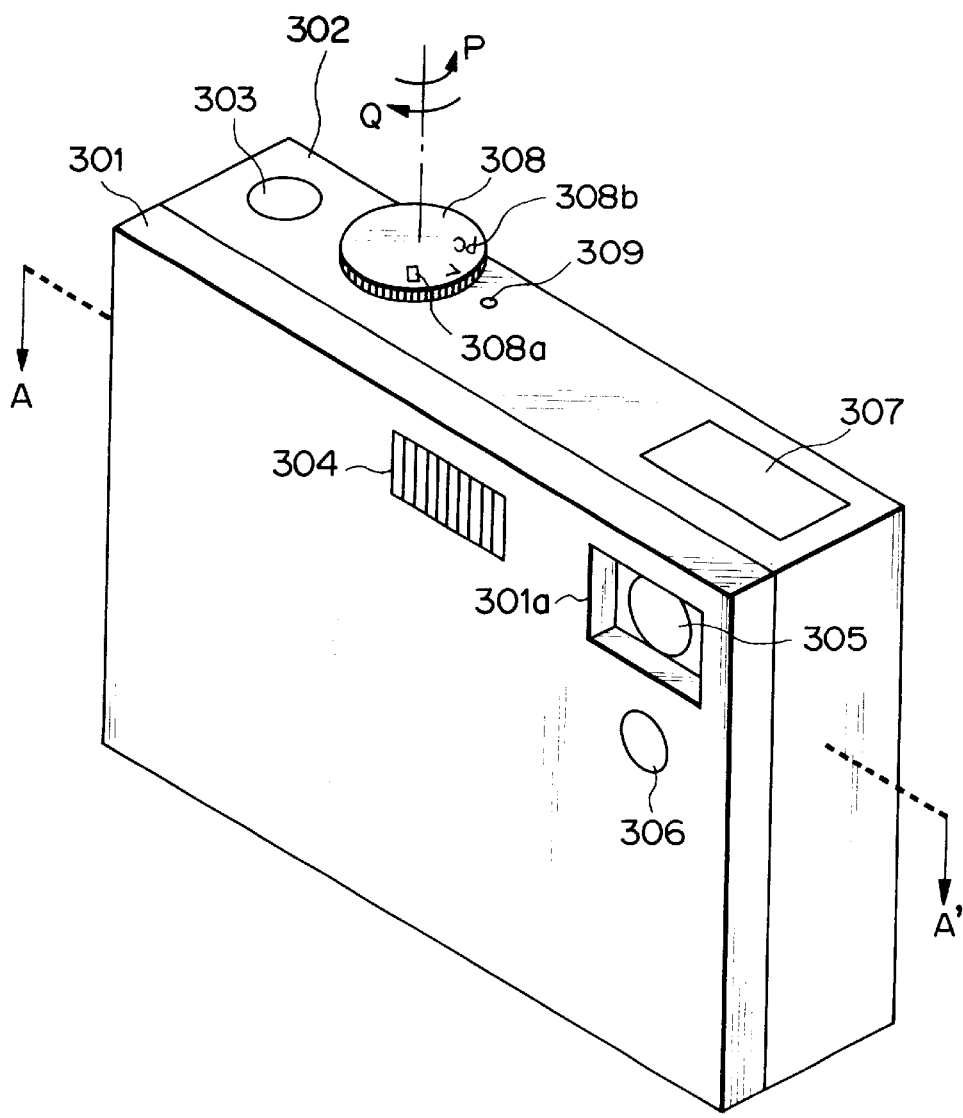
FIG. 18 is a perspective view showing a brief external configuration of a conventional digital still camera.

Meanwhile, among digital still cameras, there is a camera having an image sensing lens on the left portion, as shown in FIG. 18, and there is a possibility that a consumer would not select to buy such a camera because of its appearance since he/she is accustomed to the appearances of 35 mm cameras. In the camera according to the present invention, the image sensing lens is arranged at about the center of the camera since the optical block 201 is placed next to the battery area 42. Thus, a small camera whose shape is familiar to consumers is realized.

(4) The shield case (not shown) which enters the camera through the rectangular hole 40h (FIG. 7) of the frame 40 has the inverter board 206 inside. The inverter board 206 may also generates noise, and it is preferable to arrange it at a separate position from signal processing circuits, such as the main board 203 and the image sensing board 205, within a crowded inside of a small camera. Accordingly, by arranging the LCD board 207 for operating the color LCD 17 between the inverter board and the signal processing circuits, as shown in FIG. 8, it is possible to cut noise from the inverter board 206.

(5) The tripod taphole 26 is preferably fixed to the basic structure of the camera body for utilization purpose; thus, it is fixed to the frame 40 with the screws 49. The frame 40 is connected to the ground of the power supply board 208 at the lug 51a of the shield case D 51, as described above, thus, the tripod taphole 26 is also grounded.

Next, the fixing of the tripod taphole to the frame 40 is explained.

FIG. 9 is a vertical cross-sectional view of the tripod taphole, and the front cover 1, the back cover 2, and the LCD board 207 are fixed to the tripod taphole 26 with screws 29, 28, and 53, respectively, so as to have electrical connection with the tripod taphole 26. As described above, the tripod taphole 26 is fixed to the frame 40, which is the base structure of the camera body, and, since the hard front cover 1 and the hard back cover 2, both made of metal, wrap the frame 40, a very tough camera is realized. Accordingly, it is possible to fix the camera on a tripod at a screw portion 26b or to fix an accessory to the screw portion 26b.

Further, the tripod taphole 26 is grounded via very small ground resistance, thus, the metal front cover 1, the metal back cover 2, and the LCD board 207 are also grounded. As a result, outside frame of the camera is grounded, which makes the camera not easily affected by external noise and static electricity, as well as reduces noise, e.g., undesired radiation, radiated from the camera to the outside. In addition, the LCD board 207 is firmly supported.

[Mode Dial]

Next, the mode dial 8 and the pointer 9 are explained in detail.

Referring to FIG. 10, the mode dial 8 is supported by the boss 8a by engaging with the cylinder portion 60a of the release base 60 so as to be rotatable, and the brush 65 is fixed at the top of the mode dial 8 with the screw 66. When an operator rotates the mode dial 8 in the direction of the arrow A, shown in FIG. 11, to change modes, then the member 61 is pushed toward the center against the force of the spring 62 along a slope of the groove 8b, thereafter enters the groove 8c. This creates the clicking texture. This also goes for the other grooves 8d to 8h.

At this time, which mode is selected is known by checking which mark of the mode dial 8, shown in FIG. 6, is set at the pointer 9. If the position of the mark on the mode dial 8 is not perfectly set at the pointer 9, it would give an impression to the operator that the camera is cheap, even though the a selected mode is recognizable. Accordingly, the pointer 9 is formed on the release base 60 which guides the mode dial 8 in the first embodiment, thereby realizing precise positioning of the pointer 9.

Further, since the release base 60, on which the pointer 9 is formed, and the back cover 2 are separate parts, the release base 60 is easily formed in different color and material from those of the back cover 2, which makes the pointer 9 easily recognized. Furthermore, since positioning between the release base 60 and the back cover 2 is performed with the pointer 9, it is unnecessary to provide a locating lug or plate, for instance, to the release base 60.

Second Embodiment

Figure 13:
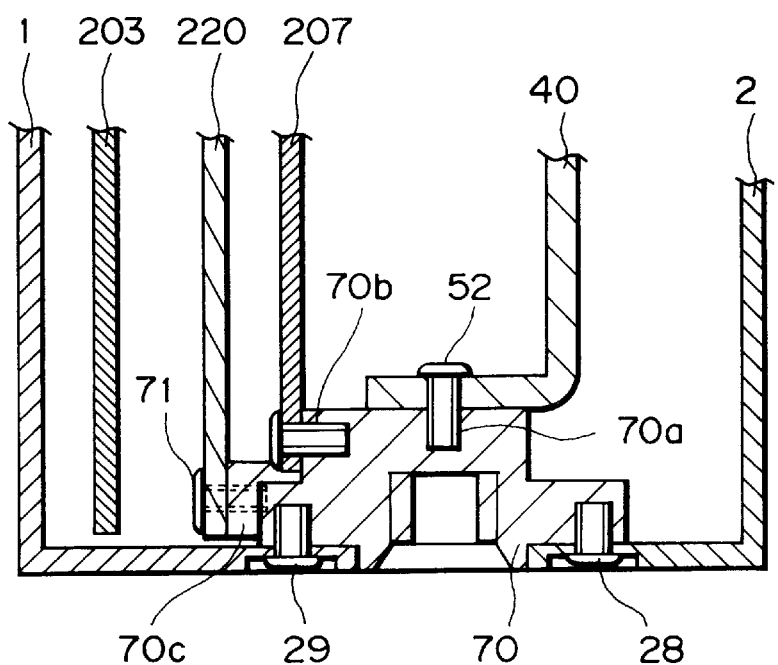
FIG. 13 is a vertical cross-sectional view of a tripod taphole and its vicinity according to a second embodiment.

FIG. 13 is a vertical cross-sectional view of a tripod taphole and its vicinity according to the second embodiment of the present invention. In FIG. 13, the same units and elements as those shown in FIG. 9 are referred to by the same reference numerals and explanation of them is omitted. In FIG. 13, reference numeral 70 denotes a tripod taphole according to the second embodiment of the present invention, and has a screw portion 70a for fixing to the frame 40, a screw portion 70b for fixing the LCD board 207, and a screw portion 70c for fixing an image sensing board 220. Reference numeral 220 is an image sensing board and fixed to the tripod taphole 70 with a screw 71.

With the aforesaid configuration, the image sensing board 220, which is a signal processing board, is also grounded via a small resistance in the second embodiment. When the signal processing board is affected by noise, deterioration of an image is caused, which lowers the commercial value of the camera. Accordingly, by grounding the signal processing board, a camera which is less affected by noise is realized. Further, the image sensing board 220 is fixed to the tripod taphole 70 which has mechanical strength, thus, the image sensing board 220 is supported firmly.

Third Embodiment

Figure 14:
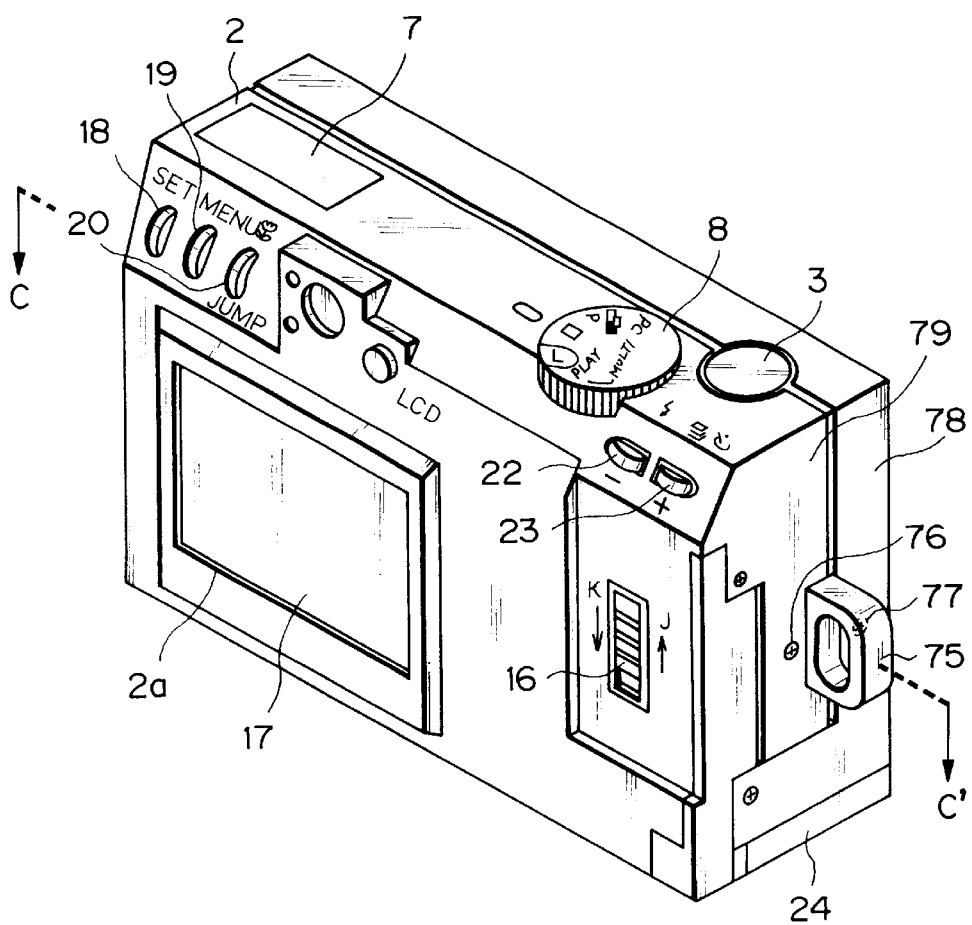
FIG. 14 is a perspective view showing a brief external configuration of the back of a digital still camera according to a third embodiment.

FIG. 14 is a perspective view showing a brief external configuration of a digital still camera seen from the back according to the third embodiment of the present invention. In FIG. 14, units and elements as those shown in FIG. 3 are referred to by the same reference numerals, and explanation of them is omitted. In FIG. 14, reference numeral 75 denotes a strap ring, and fixed to the camera with screws 76 and 77; 78, a front cover formed so as to fit the shape of the strap ring 75; and 79, a back cover formed so as to fit the shape of the strap ring 75.

Figure 15:
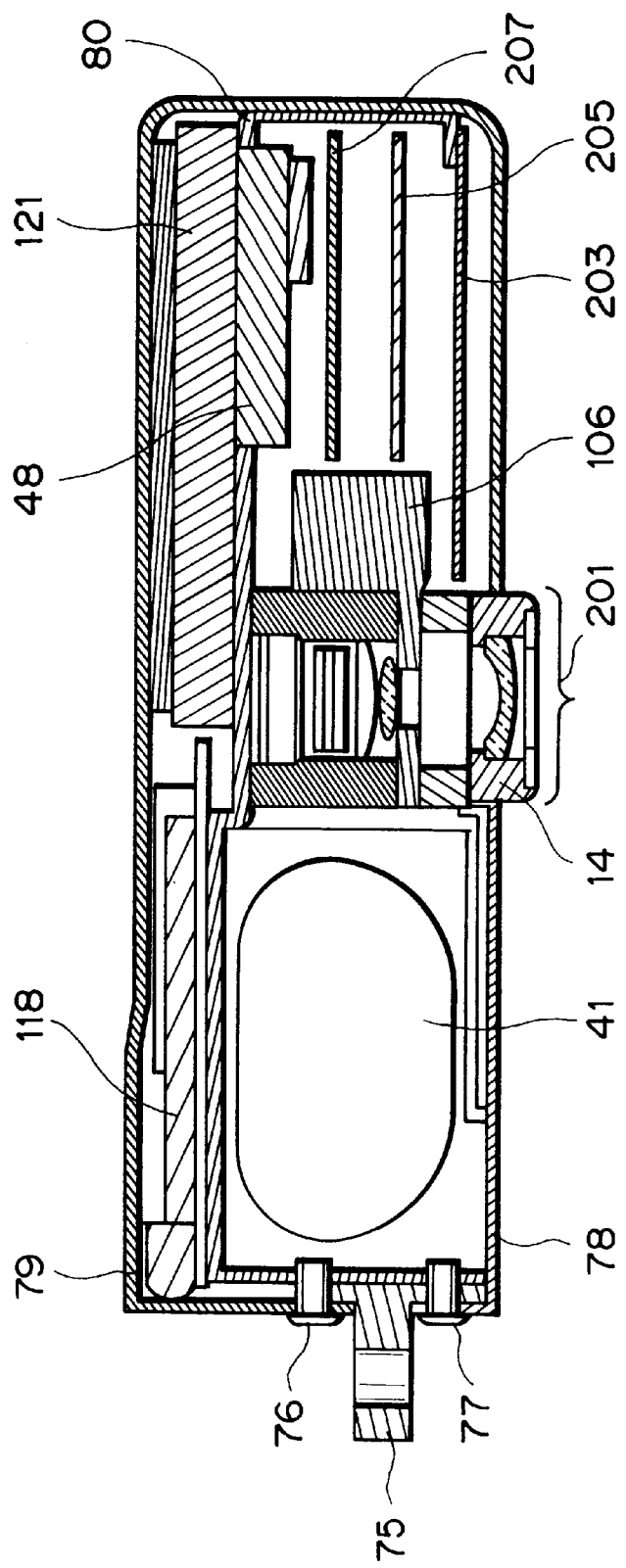
FIG. 15 is a cross-sectional view of the digital still camera shown in FIG. 14 taken along the line C–C'.

FIG. 15 is a cross-sectional view of the digital still camera shown in FIG. 14 taken along the line C–C' according to the third embodiment. In FIG. 15, reference numeral 80 denotes a frame to which the strap ring 75 is fixed.

Referring to FIG. 15, the strap ring 75 is fixed to the front cover 78, the back cover 79, and the frame 80 with screws 76 and 77 so as to have electrical connection to each other. The frame 80 is connected to the ground of the power supply board 208; therefore, the front cover 78 and the back cover 79 are also grounded via the strap ring 75.

As a result, outside frame of the camera is grounded, which makes the camera not easily affected by external noise and static electricity, as well as reduces noise, e.g., undesired radiation, radiated from the camera toward the outside.

Further, since the strap ring 75 is fixed to the frame 80 which is the base structure of the camera body, the strip 75 is fixed to the camera very firmly and securely.

Fourth Embodiment

Figure 16:
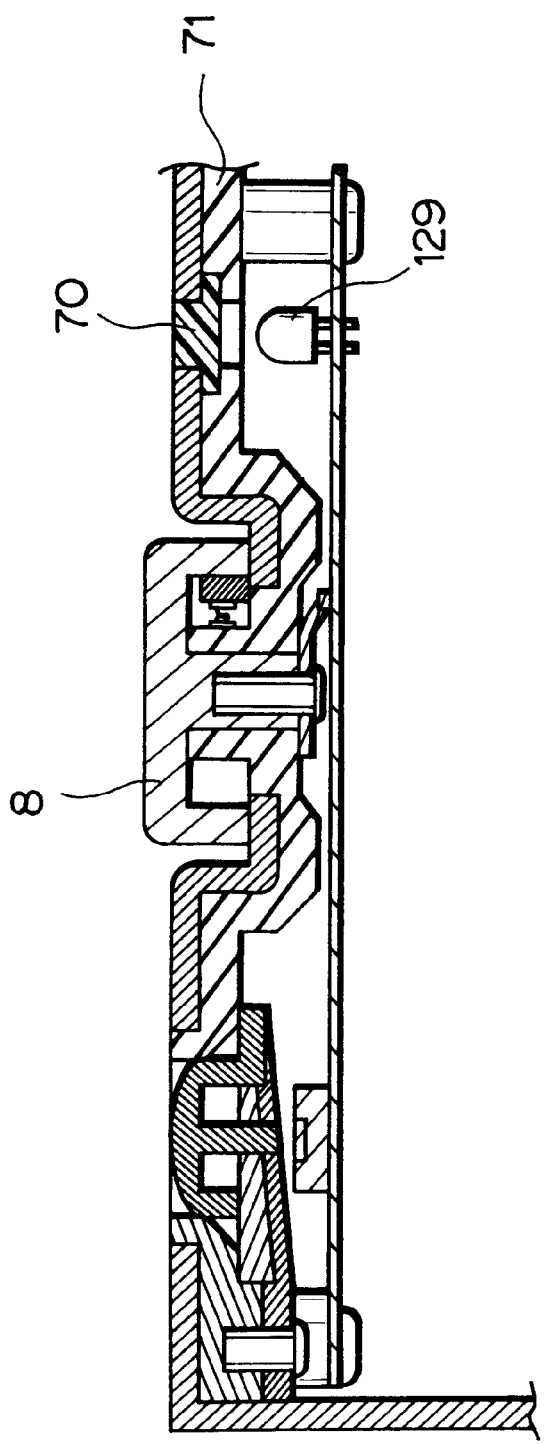
FIG. 16 is a vertical cross-sectional view of a mode dial and its vicinity according to a fourth embodiment.

FIG. 16 is a vertical cross-sectional view of a mode dial and its vicinity according to the fourth embodiment of the present invention. In FIG. 16, units and elements as those shown in FIG. 10 are referred to by the same reference numerals, and explanation of them is omitted. Reference numeral 70 denotes a pointer made of transparent resin; 71, a release base on which the pointer 70 is adhered at a precise position; and 129, a mode LED which will be explained later with reference to FIG. 17.

Figure 17:
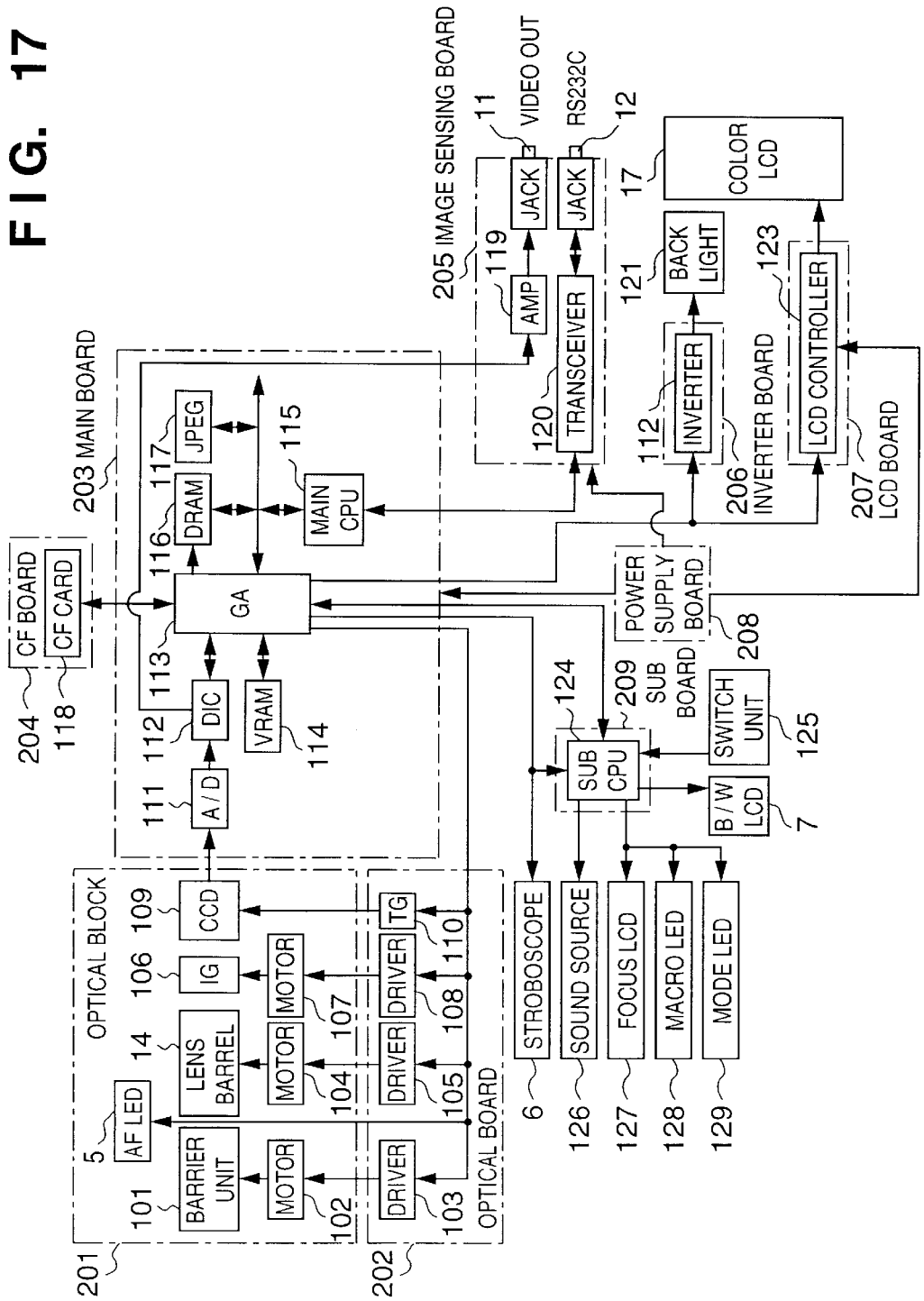
FIG. 17 is a block diagram illustrating a configuration of the digital still camera according to the fourth embodiment.

FIG. 17 is a block diagram illustrating a configuration of the digital still camera according to the fourth embodiment, and reference numeral 129 is the mode LED which emits green or red light when to indicate the mode of the camera. Other elements and units as those shown in FIG. 5 are referred to by the same reference numerals, and explanation of them are omitted.

With the aforesaid configuration, when the mode dial 8, shown in FIG. 16, is rotated to select one of the image sensing modes, such as the green mode, program mode, and switch mode, then the main CPU 115 makes the mode LED 129 emit green light. The pointer 70 passes the green light, since it is transparent, thereby notifies an operator that the current mode is an image sensing mode.

Further, when the mode dial 8 is rotated to one of the image play modes, such as the play mode, multidisplay mode, and PC communication mode, then the main CPU 115 makes the mode LED 129 emit red light. The pointer 70 passes the red light, since it is transparent, thereby notifies the operator that the current mode is an image play mode.

As described above, the color of the pointer 70 changes depending upon the type of the selected mode, thus the operator easily and surely sees the current mode.

It should be noted that the fourth embodiment of the present invention is applicable to a housing of other electronic device.

The present invention is not limited to the above embodiments and various changes and modifications can be made within the spirit and scope of the present invention. Therefore to appraise the public of the scope of the present invention, the following claims are made.

What is claimed is:

1. An image sensing apparatus comprising:

a photographic optical system;

an image sensing device for converting an optical image formed by said photographic optical system into electric signals;

a signal processing unit for processing the electric signals from the image sensing device into image signals for displaying, transmitting to an external device, or recording on a detachable recording medium; and a power supply unit for supplying electric power to the image sensing apparatus, wherein said photographic optical system is arranged within a C-shaped frame and between said signal processing unit and said power supply unit, and said signal processing unit is attached to an arm of the C-shaped frame inside of the C-shaped frame, said power supply is attached to the other arm of the C-shaped frame outside of the C-shaped frame.

2. The image sensing apparatus according to claim 1, wherein said frame's cross-section has a C-letter shape, and said signal processing unit and said power supply unit are fixed to respective arms of the C-letter shape of said frame, said photographic optical system is arranged at the middle of the C-letter shape of said frame, said recording unit is arranged behind said power supply unit, and said monitor is arranged behind said signal processing unit.

3. The image sensing apparatus according to claim 1, wherein said frame is made of metal chassis capable of blocking electric noise.

4. The image sensing apparatus according to claim 2, wherein said frame is made of metal chassis capable of blocking electric noise.

5. The image sensing apparatus according to claim 1, further comprising:

an accessory fixing part made of conductive material;

a front cover made of conductive material; and a back cover made of conductive material, wherein said front cover, said back cover, and said frame are grounded via said accessory fixing part.

6. The image sensing apparatus according to claim 2, further comprising:

an accessory fixing part made of conductive material;

a front cover made of conductive material; and a back cover made of conductive material, wherein said front cover, said back cover, and said frame are grounded via said accessory fixing part.

7. The image sensing apparatus according to claim 5, wherein said signal processing unit is grounded via said front cover or said back cover.

8. The image sensing apparatus according to claim 6, wherein said signal processing unit is grounded via said front cover or said back cover.

9. The image sensing apparatus according to claim 5, wherein said accessory fixing part comprises a tripod mount.

10. The image sensing apparatus according to claim 6, wherein said accessory fixing part comprises a tripod mount.

11. The image sensing apparatus according to 5, wherein said accessory fixing part comprises a strap mount.

12. The image sensing apparatus according to claim 6, wherein said accessory fixing part comprises a strap mount.

13. An image sensing apparatus comprising:

a photographic optical path forming part;

an image sensing device for converting an optical image formed through said photographic optical path forming part into electric signals;

a signal processing unit for processing the electric signals from the image sensing device into image signals for displaying, transmitting to an external device, or recording on a detachable recording medium; and a power supply unit for supplying electric power to the image sensing apparatus, wherein said photographic optical path forming part is arranged within a C-shaped frame and between said signal processing unit and said power supply unit, and said signal processing unit is attached to an arm of the C-shaped frame inside of the C-shaped frame, said power supply is attached to the other arm of the C-shaped frame outside of the C-shaped frame.

* * * * *